United States Patent [19]
Jacoff et al.

[11] Patent Number: 6,148,530
[45] Date of Patent: Nov. 21, 2000

[54] LEVEL WITH SNAP ACTION VIAL HOLDER

[75] Inventors: Sydney Jacoff, Great Neck, N.Y.; Sheldon Schmidt, Paramus, N.J.

[73] Assignee: Great Neck Saw Manufacturers, Inc., Mineola, N.Y.

[21] Appl. No.: 09/174,129

[22] Filed: Oct. 16, 1998

[51] Int. Cl.[7] .................................. G01C 9/26; G01C 9/28
[52] U.S. Cl. ................................. 33/377; 33/379; 33/381; 33/384
[58] Field of Search .............................. 33/377, 365, 379, 33/381, 382, 383, 384, 389

[56] References Cited

U.S. PATENT DOCUMENTS

| | | |
|---|---|---|
| 1,133,936 | 3/1915 | Coughlin . |
| 1,212,735 | 1/1917 | Ritter . |
| 1,712,201 | 5/1929 | Deneen . |
| 1,757,283 | 5/1930 | Zieman . |
| 1,878,751 | 9/1932 | Axt et al. . |
| 2,527,961 | 10/1950 | Rantz . |
| 3,190,010 | 6/1965 | Johnson ................................. 33/381 |
| 3,225,451 | 12/1965 | Olexson et al. . |
| 3,738,015 | 6/1973 | De Jong ................................. 33/379 |
| 4,843,724 | 7/1989 | Greenland ............................. 33/386 |
| 4,996,777 | 3/1991 | Grosz ..................................... 33/379 |
| 5,033,199 | 7/1991 | Wilcox et al. ......................... 33/379 |
| 5,255,443 | 10/1993 | Schmidt ................................ 33/373 |
| 5,406,714 | 4/1995 | Baker et al. .......................... 33/379 |

*Primary Examiner*—Christopher W. Fulton
*Attorney, Agent, or Firm*—Lovercheck and Lovercheck

[57] ABSTRACT

A spirit level having a sub-assembly on the body. The sub-assembly has a vial holder having two spaced pockets. A curved vial having two ends received in the pockets and resilient ribs having a curve matched to the vial and engaging the vial to hold the vial in an adjusted position. Each vial can be adjusted relative to a separate vial holder and each vial holder/vial sub-assembly can be independently adjusted and set relative to an appropriate edge of the level. The vial snaps into a fixed receptacle on either side of the vial holder. One side of the holder is curved to match the curve of the vial to insure that the vial is properly positioned. The underside of the vial holder may be relieved to increase flexibility to make it easier to snap the vial into place.

23 Claims, 10 Drawing Sheets

LEVEL WITH SNAP ACTION VIAL HOLDER

BACKGROUND OF THE INVENTION

This invention relates to levels and more particularly to level vial holders having a curved vial that snaps into place in a pocket in the vial holder against a curved rib that prevents the vial from rotating.

An important problem in the manufacture of levels is to insure that the level vial will always be properly related to the working surface of the level body in order to assure accuracy in the operation of the level. Another problem is that there is a need for levels with vials that can be adjusted relative to each other and to the working surfaces of the level.

Applicant is aware of the following U.S. Pat. Nos.: 1,133,936; 1,212,735; 1,712,201; 1,757,283; 1,878,751; 2,527,961; 3,225,451; 4,843,724; 4,996,777; and, 5,255,443.

SUMMARY OF THE INVENTION

A spirit level having a sub-assembly on the body. The sub-assembly has a vial holder having two spaced pockets. A curved vial is provided having two ends received in the pockets. A resilient rib is provided having a curve matched to the curved vial. The resilient rib engages the vial whereby the vial is held in an adjusted position in relation to another curved vial. All the embodiments have the ability to adjust each vial relative to a separate vial holder and each vial holder/vial sub-assembly can be independently adjusted and set relative to an appropriate edge of the level. The vial snaps into a fixed receptacle on either side of the vial holder. One side of the holder is curved to match the curve of the vial. This insures that the vial is properly positioned.

In one embodiment, the underside of the vial holder is relieved to increase flexibility. This makes it easier to snap the vial into place. Once mounted to the level, the vial cannot flex or allow the vial to fall out of the holder. The relief also increases the visibility of the bubble. The top surface of the vial holder is slightly below the sidewalls. This is done to create an area for adhesive. The vial holder is bonded to the wood once it is set in the correct position. The vial holder/glass plates are secured to the wood with either putty or a rubber or plastic grommet that is bonded to the wood of the level body.

In another embodiment, the web of the level body has a window sandwiched between two vial holders. Each vial holder has a vial having its ends received in spaced pockets at one side of the vial holder so that the vial on the vial holder is disposed in the window in side by side relation to each other. Each vial holder has a resiliently supported curved rib engaging the vial on the vial holder engaging the vial into the pockets. Each vial holder has support means engaging the vial on the other vial holder holding the other vial in the other pockets.

Applicant has provided a curved level vial holder wherein a rib has a curvature which matches the curvature of the level vial and a resilient rib mounting support is attached to the vial holder which insures that the vial is positively and properly related to the working surface of the level body and insures that the level vial is permanently, positively and properly positioned against the vial holding structure of the level. The resilient rib in each vial holder subassembly enables the vial to be independently adjusted and set relative to the appropriate edge of the level. The support snaps the vial into place in pockets on the level support. The vial sits in a pocket held in place by the rib.

Three embodiments of the invention are disclosed each having two key features. The key features of all three embodiments are:

1. The ability to adjust each vial relative to a separate vial holder.
2. Each vial holder/vial sub assembly is independently adjustable and set relative to the appropriate edge of the level body.

Some particular features of the invention shown in FIGS. 13–20 are;

1. The ends of the vial snap into fixed pocket means on either side of the vial holder.
2. One side of the holder is curved to match the curve of the vial. This insures that the vial is properly positioned.
3. The underside of the vial holder is relieved to increase flexibility. This makes it easier to snap the vial into place. Once mounted to the level, the holder cannot flex out allowing the vial to fall out of the holder. The relief also increases the visibility of the bubble.
4. The top surface of the vial holder is slightly below the sidewalls. This is done to create an area for adhesive. The vial holder is bonded to the wood of the level body once it is set in the correct position.
5. The vial holder/glass plates are secured to the wood with either putty or a rubber or plastic grommet that is bonded to the wood of the level body.

The vials in each of the embodiments are held against rotation by a frictional force by the resilient means. However, it is possible to manually over-ride the frictional force and rotate each of the vials to adjust and set each vial relative to the appropriate edge of the vial and relative to the vial holder.

It is an object of the invention to provide an improved level.

Another object of the invention is to provide an improved vial holder for a level.

Another object of the invention is to provide a level that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DESCRIPTION OF THE PREFERRED EMBODIMENTS

Now with more particular reference to the drawings, FIGS. 1–12 show level 10 having body 14. Body 14 having web 12 disposed between two flanges 13 with working surfaces 11. Web 12 is sandwiched between two identical vial holders 18, which overlie window 16. Plate-like vial support 20 is supported on web 12 by pins 15 in holes 21. Vial holders 18 are held in position by pins 15 in hole 35. Vials 17 can be adjusted relative to each other and relative to working surface 11 and fixed in position by means of pins 15 in holes 21.

Figure 4:
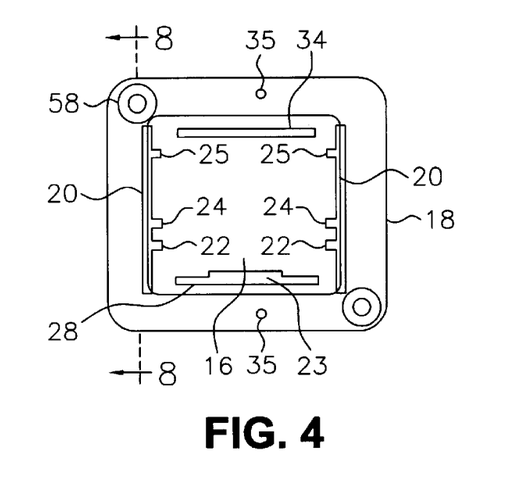
FIG. 4 is an outside view of one of the vial holders shown in FIGS. 1–3.
Figure 5:
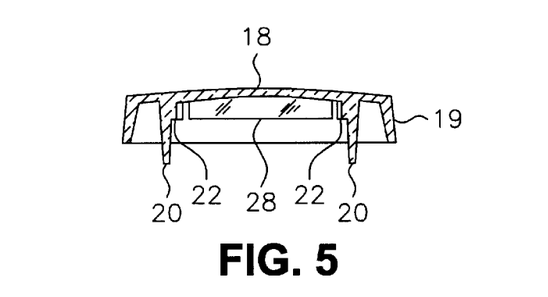
FIG. 5 is a cross sectional view of the vial holder taken on line 5—5 of FIG. 6.
Figure 6:
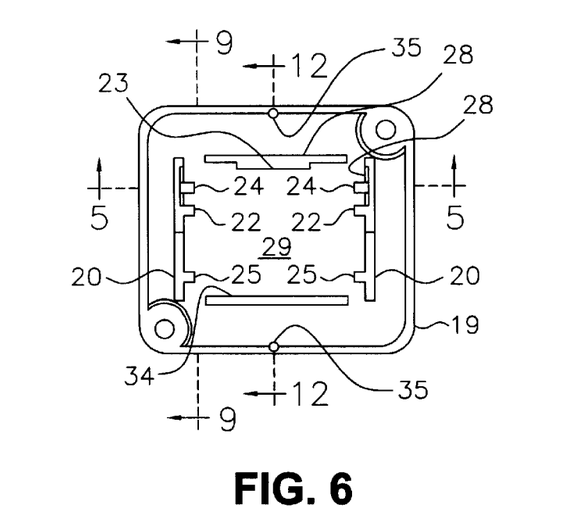
FIG. 6 is an inside view of the vial holder shown in FIGS. 1–12, rotated one hundred eighty degrees.

Each vial holder 18 is a plate like member having first side 31, second side 33, and peripheral flanges 19 extending generally perpendicular to the outer edge of first side 31.

Vial holders 18 including rib support 28 make up a sub-assembly. Each sub-assembly can be supported on web 12 with the front of each vial holder facing the other. Sub-assemblies are independently adjustable. Vial holders 18 can be fixed to web 12 in an adjusted position by holding holder with a pin 15 inserted in holes 35.

Vial holders 18 may be made of a transparent material. Vial supports 20 are fixed to the front of vial holders 18 and extend generally perpendicular thereto. Each vial holder 18 has two spaced pockets 27 on it. Each pocket comprising cleat 22 and first stop 24 attached to it on the front side adjacent the other vial support 20 adjacent pocket 27. Plate-like resilient rib supports 28 are disposed between vial holders 18 and are fixed to vial holders 18 and extend generally perpendicular to vial holders 18 and disposed between two spaced vial support 20. Curved rib 23 is attached to rib support 28 in spaced relation to vial support 20.

First stop 24 is attached to each vial support 20 adjacent cleat 22. First stop 24, cleat 22 and rib support 28 are disposed outwardly of pockets 27. Pockets 27 are formed in vial support 20 receiving an end of vial 17 and offset from vial support 20. Curved rib 23 has a curved surface that conforms to the curvature of vial 17. Rib support 28 must be sprung in a direction away from cleats 22 to provide room for vial 17 to be inserted between curved rib 23 and cleat 22 so that resilient rib support 28 acts as a snap and holds vial 17 in pockets 27.

Figure 3:
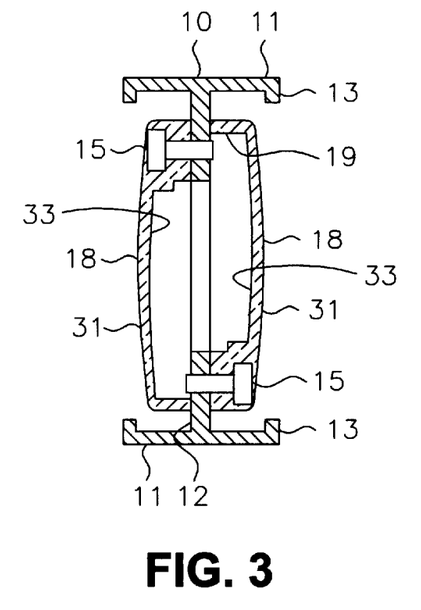
FIG. 3 is a partial cross sectional view of the level taken on line 3—3 of FIG. 1.
Figure 3A:
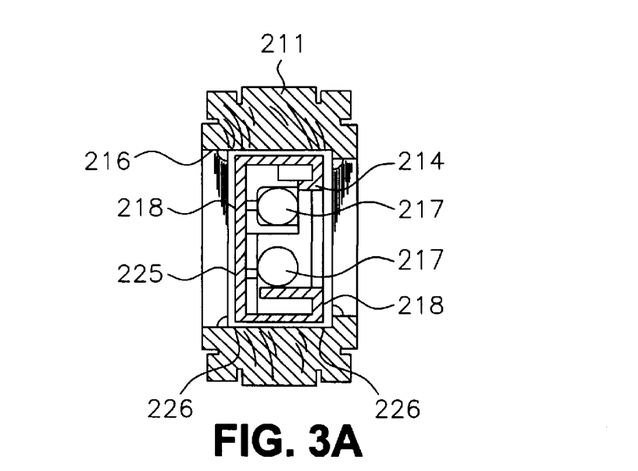
FIG. 3A is a cross sectional view of the level taken on line 3A—3A of FIG. 1A.
Figure 3B:
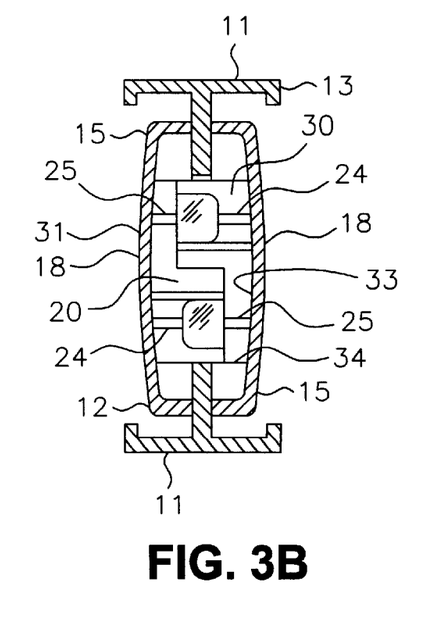
FIG. 3B is a cross sectional view taken on line 3B—3B of FIG. 1.

FIG. 3B shows how two identical vial holders 18 are supported with the front sides toward each other on level 10.

Each vial 17 is supported on first stop 24 on one holder 18 and on a second stop 25 on the other vial holder with the vial holder facing each other to prevent vial 17 from popping out of pocket 27 should vial holders 18 receive a sudden impact. Second stop 25 engages vial 17 when two identical vial holders 18 are attached to level 10 as shown in FIG. 3B. Support 34 sits directly over rib support 28 to prevent vial 17 from popping out of pockets 27 and curved rib 23 if level 10 is dropped or if vial holder 18 receives a sudden impact.

Now with reference to the embodiments shown in FIGS. 13 through 20, level 110 has body 111 and has window 116. Level 110 has two identical vial holders 118 rotated 180 degrees to each other so that second stop 125 of each vial on holder 118 engages the vial on the other holder 118 and the two vial holders rest on each other and are disposed between glass plates 126. The glass plates are held in place by putty or the like material on the marginal edges of the glass. The bottom of each end 141 of sides 140 rests on the other. Each vial holder 118 is made up of two spaced parallel plate like sides 140. Sides 140 each having downwardly extending ends 141 and narrow flexible resilient intermediate part 142 integrally attached to ends 141.

Curved resilient rib 144 is disposed between and fixed to intermediate parts 142 and holds the sides 140 in spaced relation to one another. Intermediate part 142 of sides 140 is relieved so that intermediate part 142 is considerably narrower than end parts 141 to provide flexibility and to provide increased visibility of vials 117.

Spacers 145 are disposed between ends 141 and hold ends 141 in spaced relation. Spacers 145 have a curved outer part 143 and vertical beam part 147 with inwardly extending snap 148. Curved ends of rib 144 engage vial 117.

Pockets 146 are formed at each end of vial holders 118. Pockets 146 are formed by snaps 148, ends 141 and rib 144. The ends of vials 117 are received in pockets 146.

When vial 117 is forced between projection 148, beams 147, and projections 148 will swing outwardly moving projections 148 away from each other so that vial 117 can move into pockets 146 against the curved ends of resilient curved rib 144. Thus, the ends of the vial will snap into pockets 146 when the vial is pushed into the holder. When placed in window 116 vial holders 118 will rest upon each other and against shoulder 121 with the vials visible through window 116.

Figure 13:
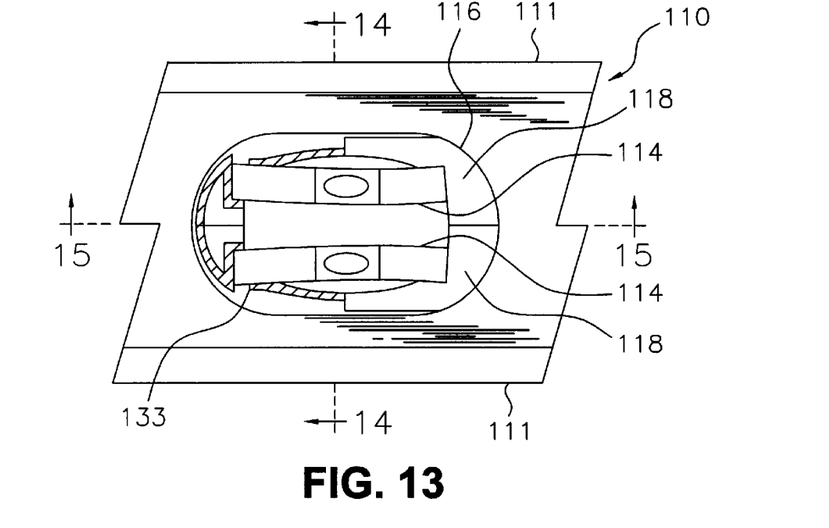
FIG. 13 is a partial side view of another embodiment of the invention.
Figure 14:
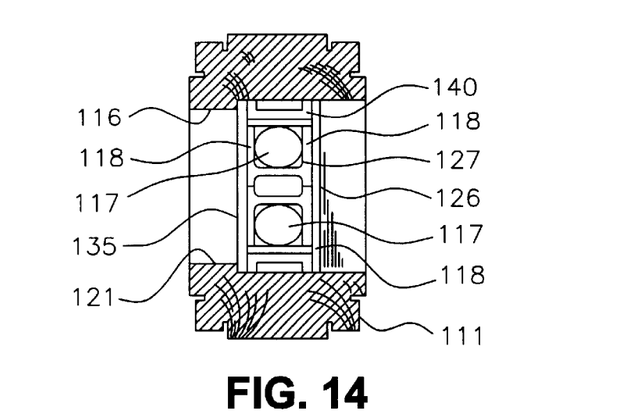
FIG. 14 is a cross sectional view of the level taken on line 14—14 of FIG. 13.
Figure 15:
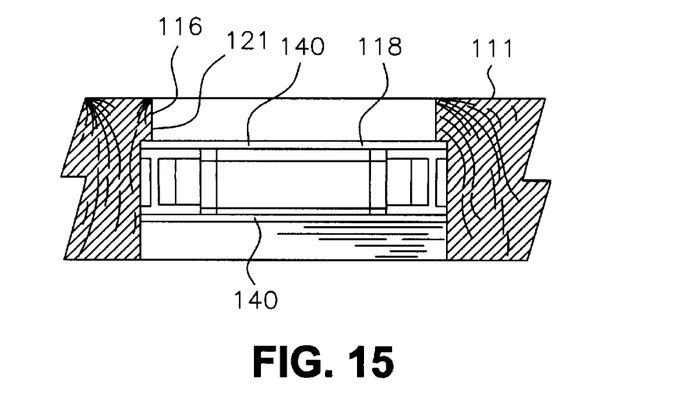
FIG. 15 is a partial cross sectional view of the level taken on line 15—15 of FIG. 13.
Figure 16:
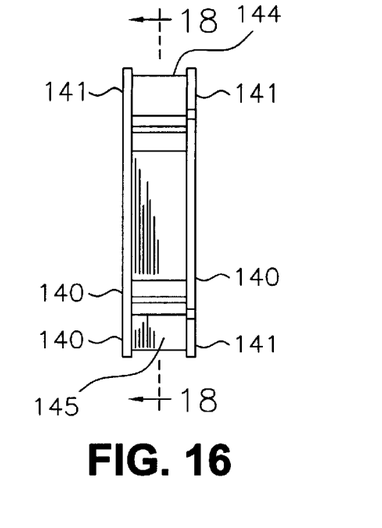
FIG. 16 is a top view of the vial holder shown in FIG. 17.
Figure 17:
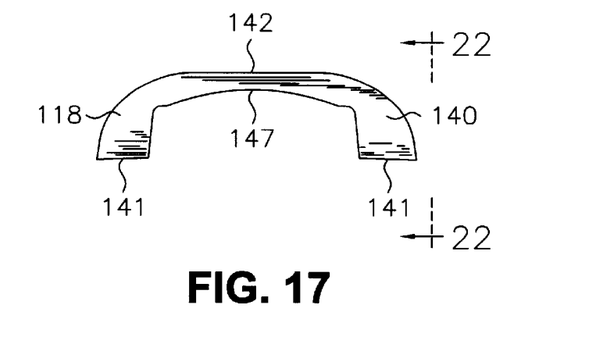
FIG. 17 is a side view of the vial holder shown in FIG. 16.
Figure 18:
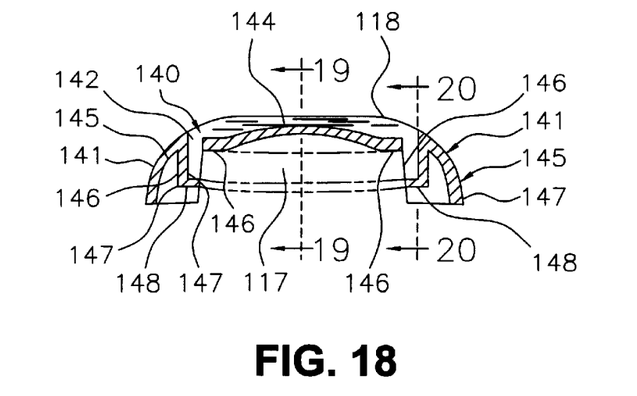
FIG. 18 is a cross sectional view of the vial holder taken on line 18—18 of FIG. 16.
Figure 19:
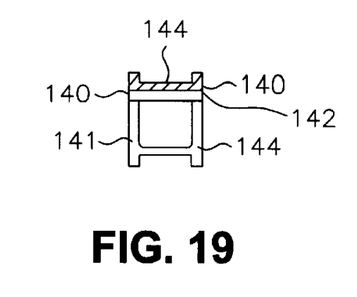
FIG. 19 is a cross sectional view of the vial holder taken on line 19—19 of FIG. 18.
Figure 20:
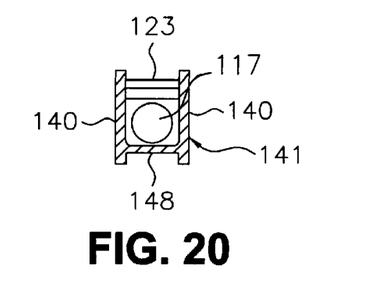
FIG. 20 is a cross sectional view of the vial holder taken on line 20—20 of FIG. 18.
Figure 21:
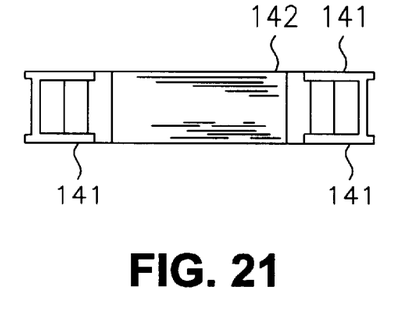
FIG. 21 is a top view of FIG. 16.
Figure 22:
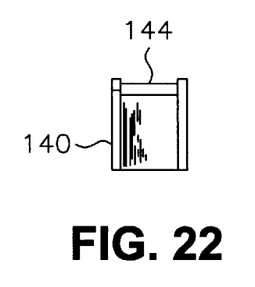
FIG. 22 is an en d view of FIG. 16.
Figure 23:
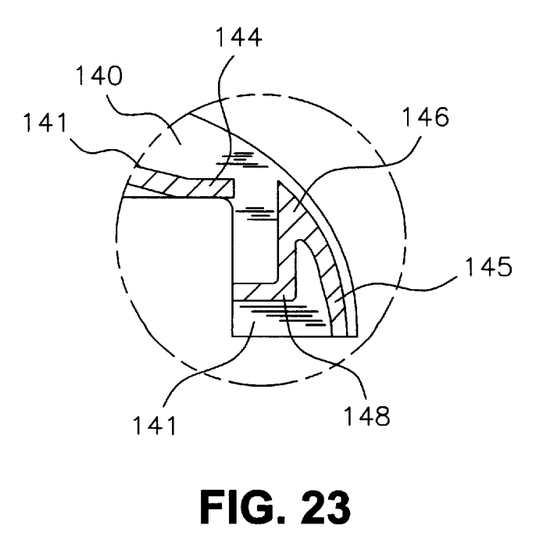
FIG. 23 is an enlarged partial view of FIG. 18.

When two identical vial holders 118 are assembled in window 116 on body 111 in the position shown in FIGS. 13, 14 and 15, each vial holders 118 will each rest on the other and can be independently positioned to adjust the vials to each other and to the appropriate surface of level body 111. In this relation, vials 117 will be supported in parallel side by side. Each said vial support 118 with vial 117 supported on it constitutes a sub-assembly. Each such sub-assembly can be independently adjusted relative to each other and relative to the working surfaces on flanges 113. Glass plate 126 is supported on shoulders 121.

Now with reference to the embodiment of the invention shown in FIGS. 1A through 11A, level 210 is shown having body 212 and window 216. Vial support 220 is supported on vial holders 218.

Figure 1:
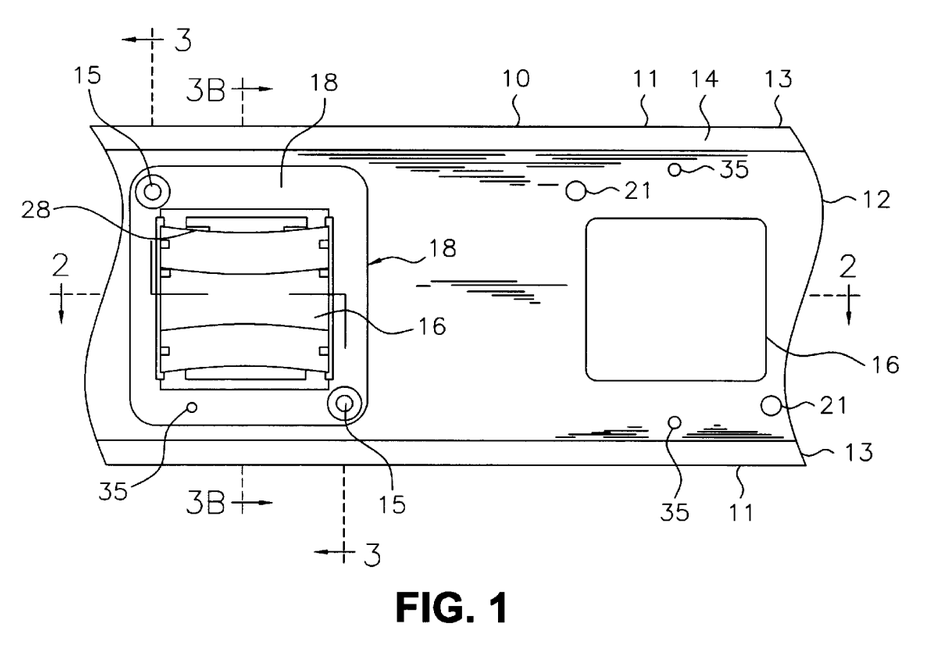
FIG. 1 is a partial side view of a level with two vial holders in place according to the invention.
Figure 1A:
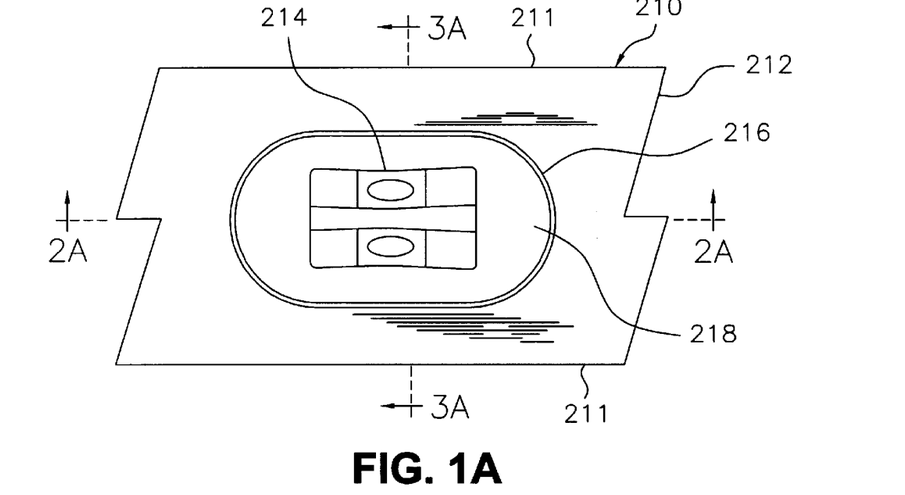
FIG. 1A is a partial side view of another embodiment of the invention.
Figure 2:
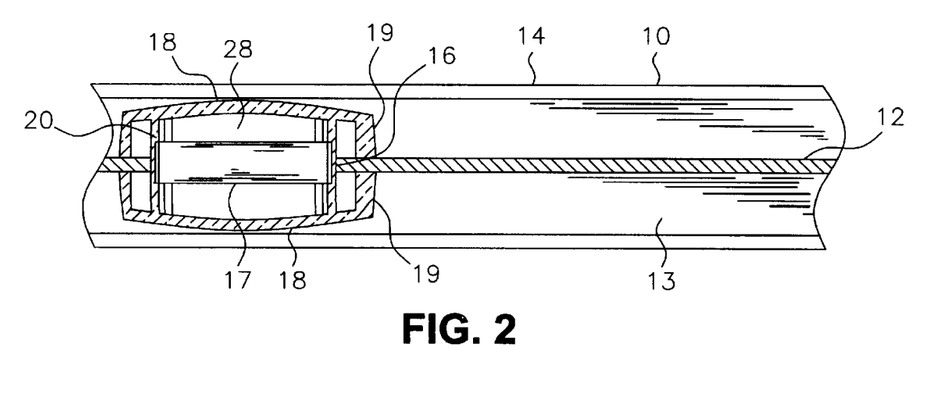
FIG. 2 is a cross sectional view of the level taken on line 2—2 of FIG. 1.
Figure 2A:
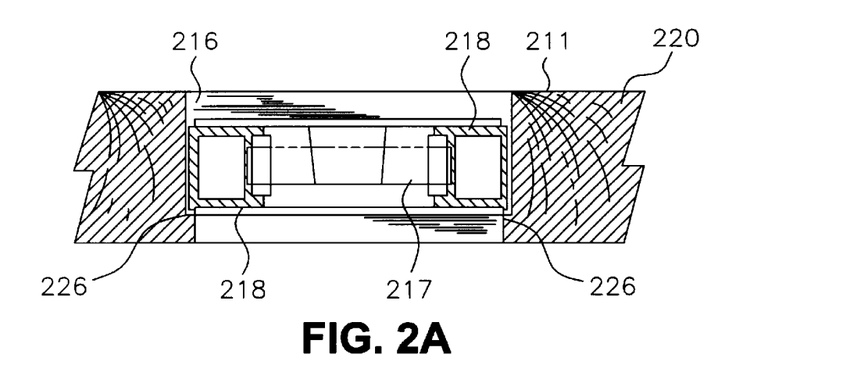
FIG. 2A is a cross sectional view of the level taken on line 2A—2A of FIG. 1A.

Vial holders 218 are received in window 216. Each vial holder 218 rests on the other holder 218 and can be independently positioned.

Figure 4A:
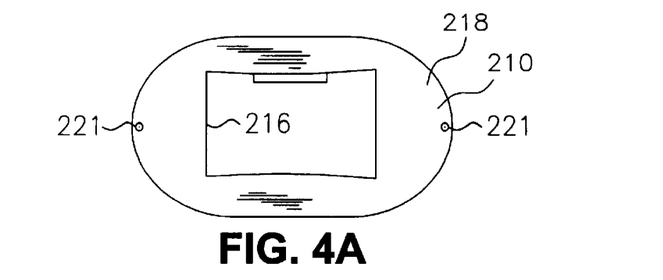
FIG. 4A is an outside view of the embodiment of the vial holder shown in FIG. 1A.
Figure 5A:
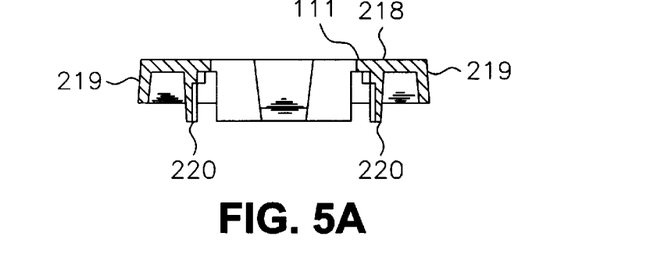
FIG. 5A is a cross sectional view of the vial holder taken on line 5A—5A of FIG. 6A.
Figure 6A:
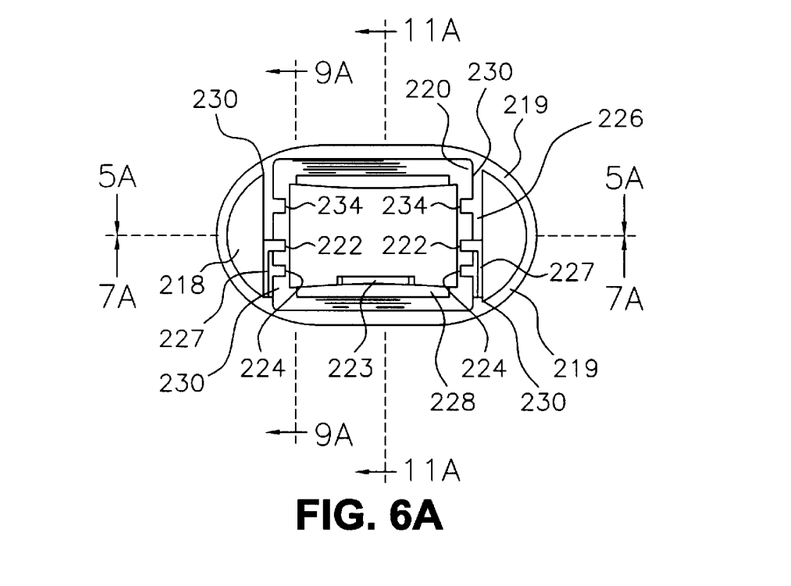
FIG. 6A is an inside view of the vial holder shown in FIG. 4A.
Figure 7:
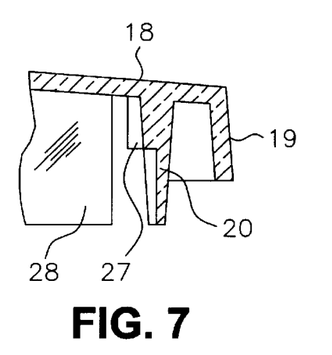
FIG. 7 is an enlarged partial view of FIG. 5.
Figure 7A:
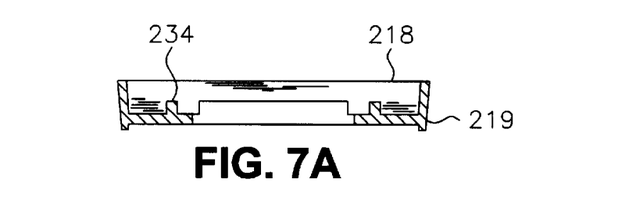
FIG. 7A is a cross sectional view taken on line 7A—7A of FIG. 6A.
Figure 8:
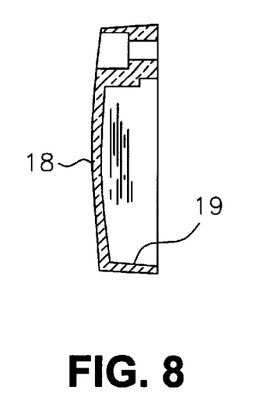
FIG. 8 is a cross sectional view taken on line 8—8 of FIG. 4.
Figure 8A:
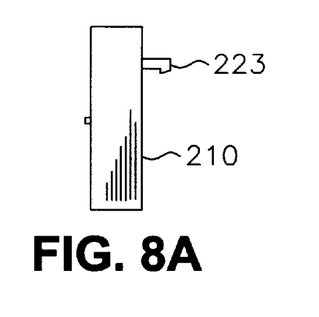
FIG. 8A is an end view of the vial holder shown in FIG. 4A.
Figure 9:
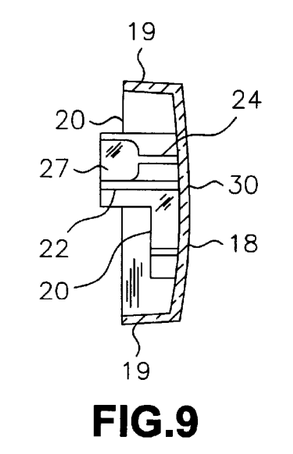
FIG. 9 is a cross sectional view taken on line 9—9 of FIG. 6.
Figure 9A:
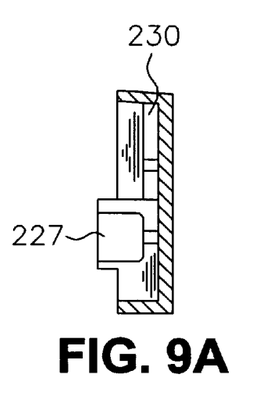
FIG. 9A is a cross sectional view taken on line 9A—9A of FIG. 6A.
Figure 10:
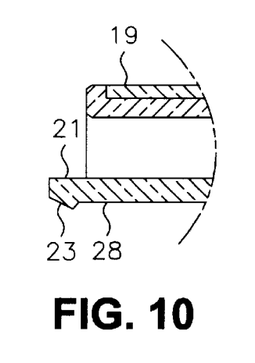
FIG. 10 is an enlarged partial view of FIG. 12.
Figure 10A:
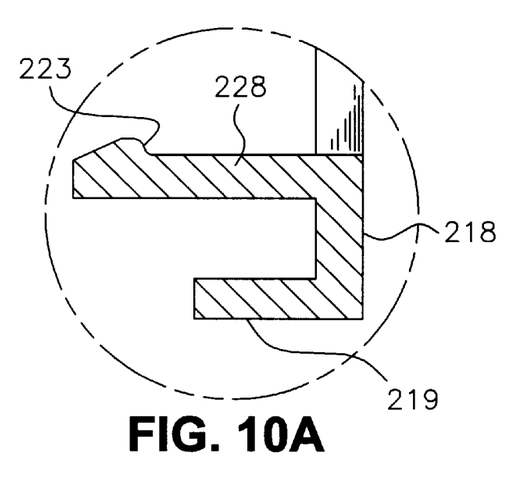
FIG. 10A is an enlarged partial view of FIG. 11A.
Figure 11:
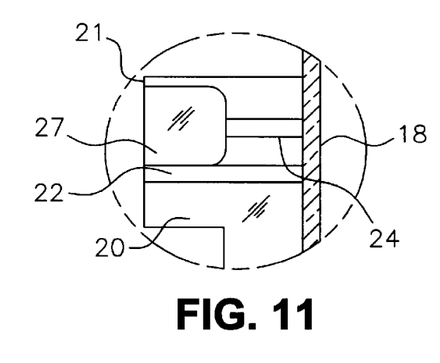
FIG. 11 is an enlarged partial view of FIG. 9.
Figure 11A:
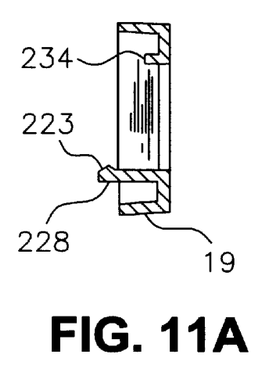
FIGURE 11A is a cross sectional view taken on line 11A—11A of FIG. 6A
Figure 12:
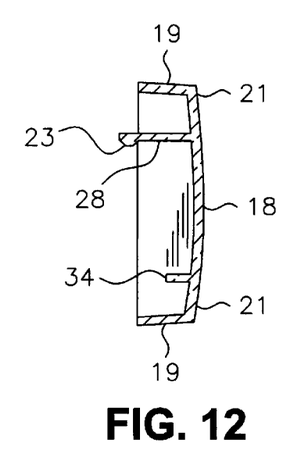
FIG. 12 is a cross sectional view taken on line 12—12 of FIG. 6.

Vial holders 218 each have a peripheral flange 219 extending generally perpendicular to the outer edge of vial holder 218. The outer edges of vial holder 218 are integrated with the flanges 219 and vial holder 218 may be made of a transparent material.

Each vial support 220 has pocket 227 formed in it and has cleat 222 and first stop 224 attached to it on the side adjacent the other vial support 220 adjacent pocket 227. Plate-like resilient rib support 228 is disposed between vial support 220 and fixed to vial holders 218 and extends generally perpendicular to vial holders 218. Curved rib 223 is attached to rib support 228 in spaced relation to vial support 220.

First stop 224, cleat 222 and rib support 228 are disposed around pocket 227. Pocket 227 is formed in vial support 220 receiving an end of vial 217. Each curved rib 223 has curved surface that conforms to the curvature of vial 217. Each rib support 228 must be sprung in a direction away from cleats 222 to provide room for vial 217 to be inserted between curved rib 223 and cleat 222 so that resilient rib support 228 acts as a snap and holds vial 217 in pocket 227. Vials 217 are offset from the center of vial holder 218. Second stop 234 is offset toward the other side of center. When two vial holders 218 are put on opposite sides of a level window, as shown in FIG. 3B, second stop 234 rests on vials 217 holding vial 217 from popping out of the receptacle. Second stop 234 is fixed to vial holder 218 and engages vial 217. This is done to prevent the vial from popping out of pocket 227 should the vial holder receive a sudden impact. Second stop 234 holds the vial in pocket 227. Second stop 234 engages vial 217 and holds it in position.

All of the embodiments have the ability to have each level vial adjusted relative to a separate vial holder and each vial holder assembly can be independently adjusted relative to the appropriate edge of the level by rotating the respective vial against its curved rib.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A level comprising a first and a second vial holder; a curved vial for each said vial holder;
   first and second spaced pocket means on said first vial holder for receiving ends of said first curved vial;
   a first resilient means on said first vial holder urging said first curved vial into said first pocket means;
   second resilient means on said second vial holder urging said second vial into said second pocket;
   each said curved vials being adjustable in said vial holder relative to the other vial holder and adjustable relative to the appropriate edge of said level;
   each said vial holder having means engaging the vial on the other vial holder holding said vial in said pockets.

2. The level recited in claim 1 wherein each said curved vial and each said vial holder comprises a sub-assembly and each said curved vial and each said sub-assembly have adjusting means whereby said vials can be independently adjusted and set relative to a working edge of said level.

3. The level recited in claim 2 wherein said resilient means on said vial holder engage said curved vial engaging said ends of each said vial to snap said vial into said pocket means.

4. The level holder recited in claim 2 wherein said resilient means comprises a curved surface to engage and to match a curve of one side of said vial to support said curved vial on said vial holder thereby insuring that said curved vial is properly positioned.

5. The level recited in claim 4 wherein said vial holder comprises a plate like member having a peripheral flange extending around said plate like member;
   said flange being disposed generally perpendicular to said vial holder;
   said flanges resting on a web of said level body.

6. The level recited in claim 5 wherein each of said vial holders has a peripheral flange attached thereto;
   said web has a window and said vials are supported over said window.

7. The level recited in claim 2 wherein each said vial holders having plate-like side members;
   said side members have end members and an intermediate part;
   said end members have projection means extending toward each other for engaging the ends of said vial;
   said intermediate part has an underside;
   said underside of said intermediate part is reduced in width to increase the flexibility thereof and to urge said pocket into place when said vial is mounted to said body holding said vial in said holder during impact on said holder;
   said reduced width of said intermediate part increasing the visibility of the bubble of said vial.

8. The level recited in claim 7 wherein means is provided on said level to adjust said vial holder relative to a separate vial holder.

9. A level having a body and a window in said body;
   two identical vial holders supported in said window;
   a first glass plate in said window;
   said vial holders resting against said first glass plate;
   a second glass plate in said window resting against said vial holders;
   attaching means supporting said second glass plate with said vial holder between said first glass plate and said second glass plate;
   said two vial holders each holding a vial are supported, one on top of the other;

each said vial holder has four corners;

each said vial holder having a vial support means on said vial holder for adjusting said vial; and, two opposite corners of each said vial holders having means to attach said holder to said level.

10. The level recited in claim 9 wherein said vial holders having a top surface disposed slightly below the upper edge of said window to create an area for adhesive for holding said vial holders in said window.

11. A level comprising two sub-assemblies;

each said sub assembly comprising a vial holder having two spaced plate-like support members each having an intermediate part;

pocket means on each said support member;

a curved vial having ends received in said pocket means;

a rib;

resilient means engaging said rib in said vial holder;

said rib curved to match said curved vial and engaging said curved vial and prevent said vial from rotating;

said resilient means engaging said vial end adapted to snap said ends of said vials into said pocket means.

12. The sub-assembly recited in claim 11 wherein said vial engages said ribs whereby said vials are each adjustable relative to a separate vial attached to said level.

13. The sub-assembly recited in claim 11 wherein said ends of said vial are adapted to be snapped into said pocket means forcing said projections outwardly away from each other whereby said projections are resiliently forced to snap said ends of said vial into said pocket means.

14. The sub-assembly recited in claim 13 wherein said ends of said vial are adapted to be swung into said pocket means by said rib.

15. The sub-assembly recited in claim 11 wherein said vial supports are received in a window in said level.

16. The sub-assembly recited in claim 11 wherein said level has a web;

one said sub-assembly is supported on each side of said web and fixed in an adjusted position relative to said other sub-assembly by means of said pin in said sub-assembly.

17. A level comprising a holder, a resilient rib support on said holder;

two spaced curved pocket means in said holder;

a curved vial having ends and resilient means engaging said vial and adapted to snap said ends of said vial into said pocket; and, said curved vial being adjustable in said holder relative to an appropriate edge of said level.

18. The level recited in claim 17 wherein a side of said rib is curved to match the curve of said vial.

19. The level recited in claim 18 wherein said vial has a bubble and said under side of said holder is relieved to increase its flexibility and to increase the visibility of said bubble.

20. The level recited in claim 18 wherein said holder has sidewalls and a top;

said level has a body having a window in said body;

said holder is disposed in said window;

said top surface of said holder is disposed slightly below said top surface;

said top surface is disposed slightly below said top edge of said sidewalls to create an area for adhesive.

21. The level recited in claim 20 wherein said vial holder is supported in said window between two glass plates;

said plates are secured to said level body by an adhesive material whereby said plates are bonded to said level body.

22. A level having a body and a window in said body;

two identical vial holders supported in said window;

a first glass plate in paid window;

said, vial holders resting against said first glass plate;

a second glass plate in said window resting against said vial holders;

attaching means supporting said second glass plate with said vial holders between said first glass plate and said second glass plate;

a curved resilient means having a rib that has two ends;

each said end having a curved shape to conform to a curvature of said vial whereby said vial can be adjusted relative to said vial holder and said curved rib prevents rotation of said vial.

23. The level recited in claim 22 wherein said vial holders having a top surface disposed slightly below the upper edge of said window to create an area for adhesive for holding said vial holders in said window.

* * * * *